(No Model.)

C. B. POST.
METAL WHEEL.

No. 442,456. Patented Dec. 9, 1890.

Witnesses
F. A. Moore
Wayne Reid

Inventor
Charles B. Post
by Wm. M. Monroe
Attorney

UNITED STATES PATENT OFFICE.

CHARLES B. POST, OF NEW LONDON, OHIO.

METAL WHEEL.

SPECIFICATION forming part of Letters Patent No. 442,456, dated December 9, 1890.

Application filed September 12, 1890. Serial No. 364,745. (No model.)

*To all whom it may concern:*

Be it known that I, CHARLES B. POST, a citizen of the United States, and a resident of New London, county of Huron, State of Ohio, have invented certain new and useful Improvements in Metal Wheels, of which I hereby declare the following to be a full, clear, and exact description, such as will enable others skilled in the art to which it appertains to make and use the same.

My invention relates to improvements in metal wheels; and its objects are to simplify the construction, lessen the initial cost of making, and to produce a durable and elastic wheel which will be capable of enduring severe strain and usage.

My invention consists in the construction of the hub and spokes and manner of attaching the spokes to the rim, as hereinafter described, shown in the accompanying drawings, and more specifically pointed out in the claims.

Figure 1:
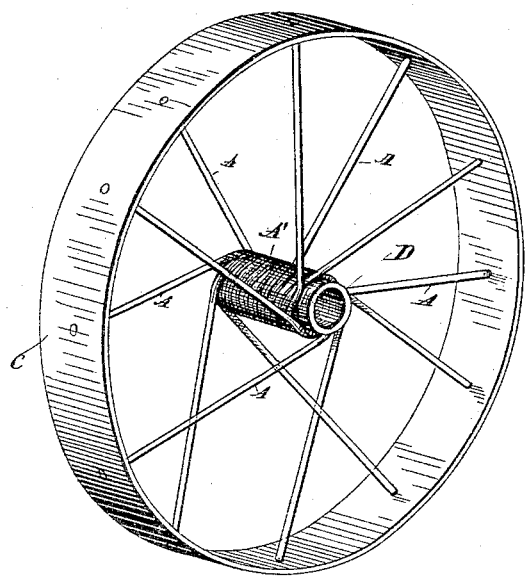
Figure 2:
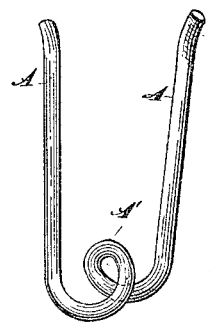
Figure 3:
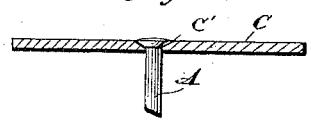
Figure 4:
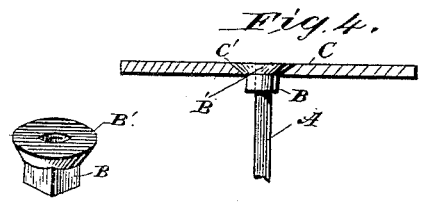

In the drawings, Figure 1 is a perspective view of a wheel constructed according to my invention. Fig. 2 is a view of a separate double spoke. Fig. 3 is a detail of rim, showing riveted spoke. Fig. 4 is a detail showing the spoke fastened to rim by a nut.

A A in the drawings are the spokes, which, it will be seen, are made of double length, with an additional helical coil A' in the central portion, so as to twice encircle the hub D. The free ends of the rod are then fastened to the rim by any common method, the forms shown being considered best. The helical coils of the spokes are wound at such a pitch as to separate widely enough to admit of one or more interlocking coils between them, as the length of the hub may require. Any number of spokes may be employed, according to the strength and stiffness desired in the complete wheel when finished, and so woven together when completed that the hub shall present a smooth, even surface.

In constructing the wheel the spokes are wound together and riveted to the rim, the helix at the central portion of each wheel being first wound over a mandrel slightly smaller than the hub to which it is to be finally attached. The next step is to force the coils upon the hub by pressure, when they hold without danger of being displaced. The final operation is to secure the spokes in the tire.

In place of a hub, as shown in the figure, the spindle upon which the wheel turns may be substituted, having end bearings, as in wheelbarrows. The spindle will then turn with the wheel.

In Figs. 3 and 4 are shown two methods of attaching the spokes to the rim. In Fig. 3 is shown a simple riveted head, and in Fig. 4 is shown a screw-threaded extremity secured in a nut B, which is provided with a conical enlargement B', countersunk in the rim C at C'. This admits of continual adjustment, when desired, and is especially adapted to broad-rimmed wheels. A detail of nut is shown in Fig. 4.

Having described my invention, what I claim as new, and desire to secure by Letters Patent, is—

1. In a metal wheel, a series of interlocking spokes formed in pairs, each pair being formed from a continuous rod having its central portion wound into a helix of such pitch as to interlock with the next succeeding similarly-formed rod, substantially as and for the purpose set forth.

2. In a metal wheel, a series of interlocking spokes in pairs, each pair being formed of a continuous rod having a helical central portion adapted to grasp and rigidly hold the hub or spindle of the wheel and interlocking throughout the length of the helix with one or more successive similar helical coils, substantially as and for the purpose set forth.

3. The herein-described method of manufacturing metal wheels, consisting in first winding the central portion of a metal rod upon a mandrel to form an open helical coil slightly smaller than the hub or spindle of the wheel, then interlocking the said coil with a similarly-prepared coil or coils, and next forcing the same thus associated upon the hub or spindle, and finally inserting the extremities of the radially-projecting rods into a suitably-prepared rim, substantially as and in the manner set forth.

4. In a metal wheel, spokes centrally coiled upon the hub or spindle of the wheel, said coils being open and interlocking, in combination with means for securing the threaded extremities of the spokes to the metallic rim, consisting in countersunk openings in the rim and nuts having enlarged conical heads fitting in these openings, projecting heads on the inner side of the rim, and threaded openings adapted to secure the threaded extremities of the rods, substantially as described.

5. As an article of manufacture, a metal wheel provided with rod metal spokes in pairs, each pair being formed from a continuous rod centrally and spirally involved with the spiral centers of the associated pairs of spokes to complete a common hub for the wheel, all arranged substantially as and in the manner set forth.

CHARLES B. POST.

Witnesses:
ROLLIN C. POWERS,
DANIEL J. C. ARNOLD.